March 16, 1965    R. W. G. HASLETT    3,174,127
ECHO SOUNDING
Filed May 12, 1961    4 Sheets-Sheet 3
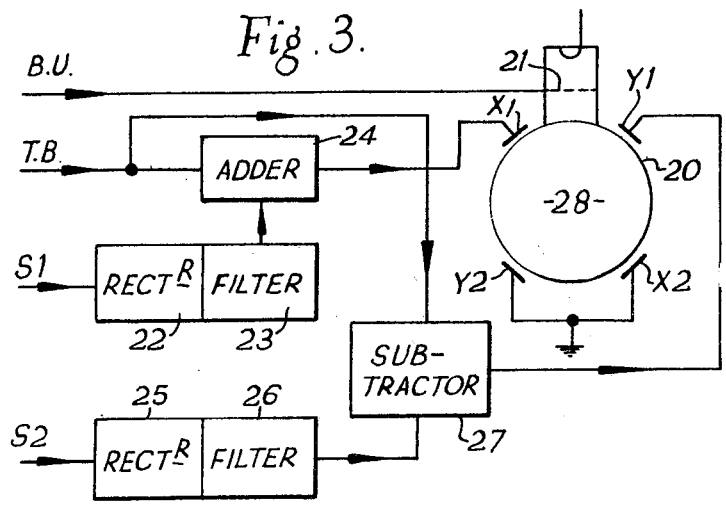
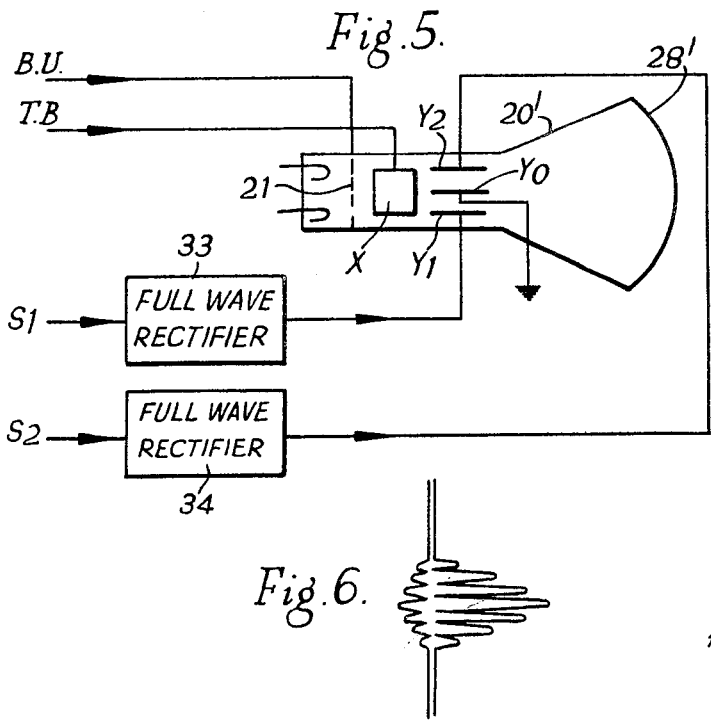
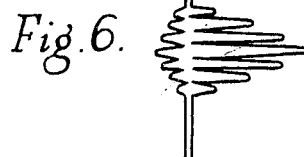
R.W.G. HASLETT
INVENTOR
ATTORNEYS

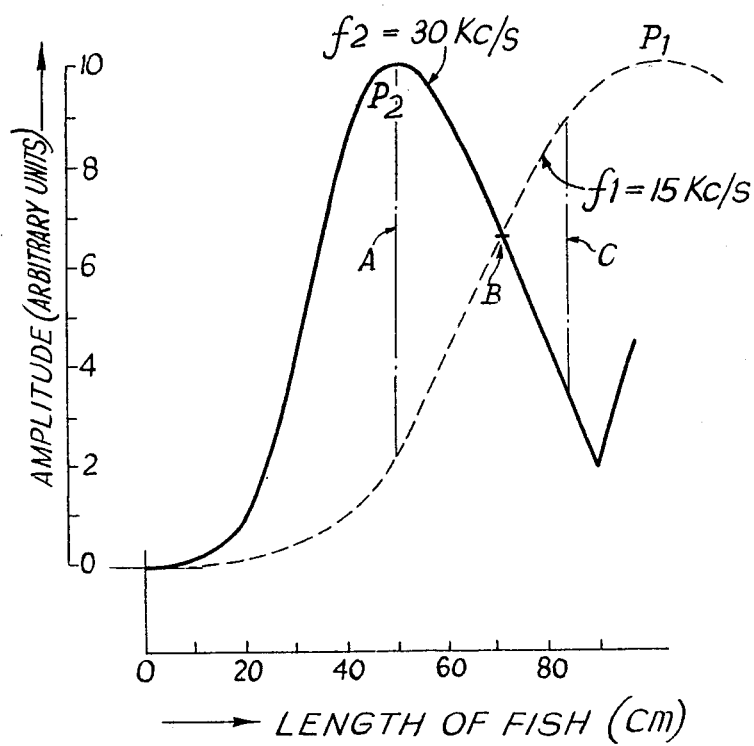

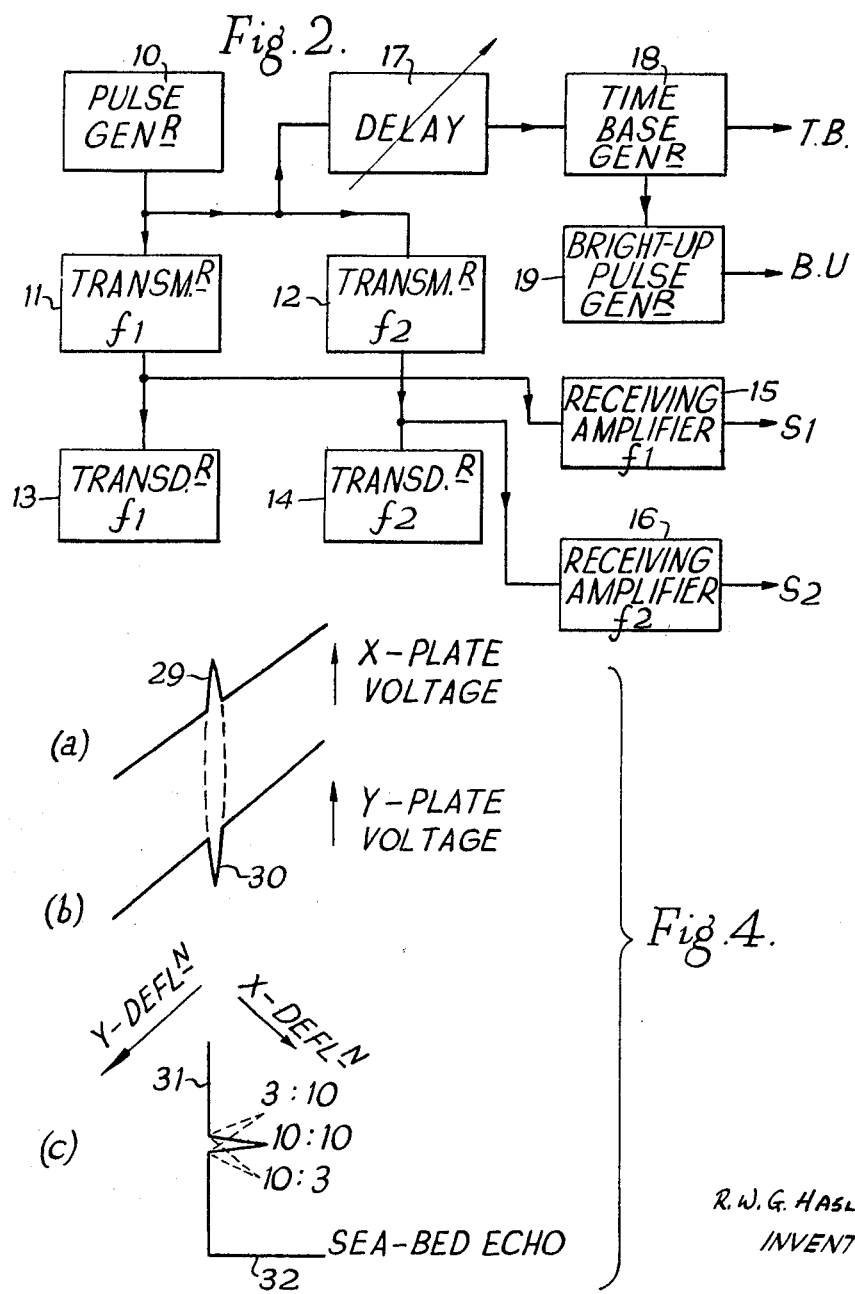

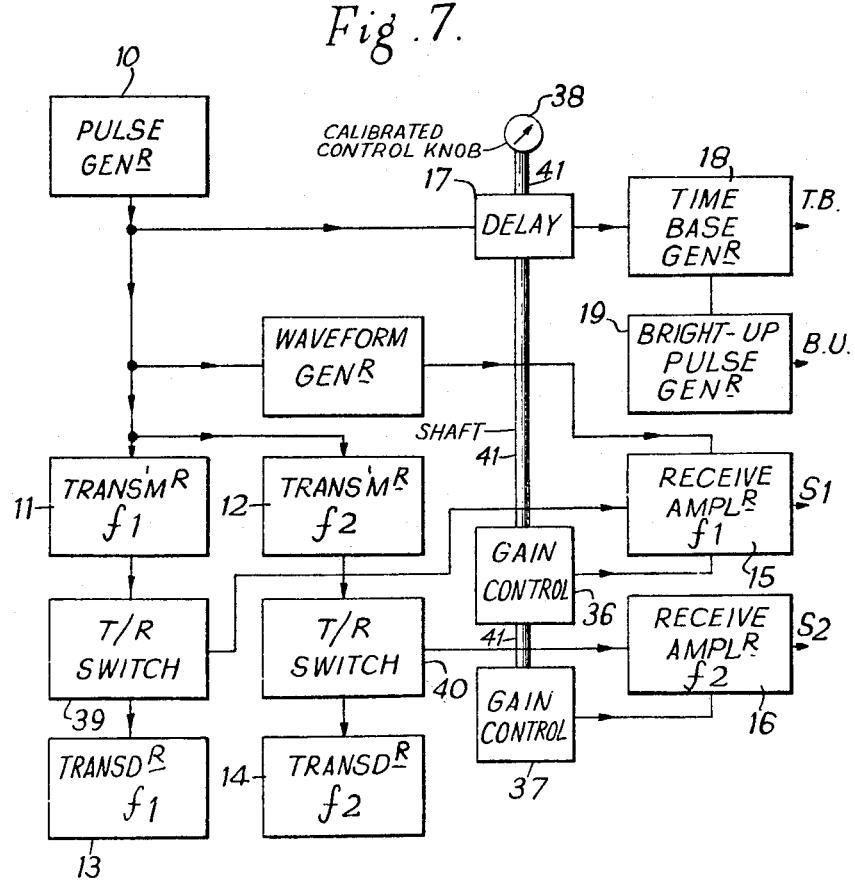

United States Patent Office 3,174,127
Patented Mar. 16, 1965

3,174,127
ECHO SOUNDING
Roy William George Haslett, Hillington, Glasgow, Scotland, assignor, by mesne assignments, to S. Smith & Sons (England) Limited, London, England, a British company
Filed May 12, 1961, Ser. No. 109,640
Claims priority, application Great Britain, May 26, 1960, 18,608/60
9 Claims. (Cl. 340—3)

The present invention relates to echo sounding using acoustic (sonic or ultrasonic) waves and has for its principal object to provide apparatus for giving an indication of the size of fish.

According to the present invention there is provided echo sounding apparatus comprising means for transmitting into water pulses of acoustic or ultrasonic waves at two different frequencies, means for receiving echoes from fish in the path of the waves at each frequency and means for comparing the amplitudes of the waves received at the two frequencies. Although two different frequencies are usually sufficient, more than two may be used. The values of the frequencies may be made adjustable.

The invention will be described, by way of example, with reference to the accompanying drawings, in which
FIG. 1 is an explanatory graph,
FIG. 2 is a block circuit diagram of part of one embodiment of the invention,
FIG. 3 is a block circuit diagram of another part of the embodiment of FIG. 2, like-referenced terminals in the two figures being regarded as connected together,
FIG. 4 contains diagrams explaining the kind of display obtainable with the embodiment of FIGS. 2 and 3,
FIG. 5 is a block circuit diagram of an alternative arrangement that may be used with that of FIG. 2, like-referenced terminals in FIGS. 2 and 5 being regarded as connected together,
FIG. 6 shows the kind of display obtainable with the apparatus of FIGS. 2 and 3, and
FIG. 7 is a block diagram of a modification of FIG. 2.

Referring to FIG. 1, this shows the general form of two graphs. The broken line curve represents echo amplitude (in arbitrary units) plotted against fish length in centimetres at a frequency $f_1=15$ kc./s., while the full line curve shows the same relation at a frequency $f_2=30$ kc./s. The echoes are for the dorsal aspect. The two curves are not to the same amplitude scale.

If the echoes are received in two separate channels, one for each frequency, and if the relative gain in the channels is so adjusted that the peaks $P_1$ and $P_2$ of the curves are of approximately the same magnitude, as shown in FIG. 1, it will be seen that the ratio of the echoes at the two frequencies varies with fish length. This ratio may be expressed as $x:10$ or $10:x$, where $x$ is a number equal to or less than 10.

In the example of FIG. 1 the ratio of the signal-amplitudes at frequencies $f_1$ and $f_2$ at point A corresponding to a fish length of about 50 cms. is about 2:10. The ratio increases to 10:10 at point B, corresponding to a fish length of about 70 cms., and rises to 10:3 at point C corresponding to a fish length of 85 cms. It is seen that a steady and unambiguous change of ratio occurs between fish lengths of about 40 and 90 cms. In addition, below 40 cms. the relative amplitude ratio remains comparatively steady at about 2:10, but the signal level on both channels declines steadily as the fish length falls. Thus, an unambiguous determination of fish length in the range 0 to 90 cms. can be made on the basis of observation of amplitude ratio and signal level.

The determination of fish length is particularly accurate in the range 40 to 90 cms. in the example quoted.

It is apparent that there is some latitude in the choice of the frequency ratio and of the frequencies used. For example, a frequency ratio slightly less than 2:1 might be the optimum. By changing the actual frequencies (keeping the ratio approximately constant) the particularly accurate range of fish length can be shifted, e.g. if measurements on small fish only are required, then instead of using 15 kc./s. and 30 kc./s. as in FIG. 1, we might use 30 kc./s. and 50 kc./s. For very large fish, 20 kc./s. and 10 kc./s. might be used.

Referring now to FIG. 2, a pulse generator 10 the output terminal of which may in practice be the transmission contact on a pen recorder, supplies pulses to transmitters 11 and 12 transmitting simultaneously bursts of oscillation at $f_1$ and $f_2$ respectively, the pulses determining the envelopes of the bursts. These bursts are applied to transducers 13 and 14 which, in this example, are common T/R transducers. Waves are emitted at the two frequencies $f_1$ and $f_2$ simultaneously by these transducers into water and echoes are picked up thereby. The transducers 13, 14 pick up selectively the frequencies $f_1$ and $f_2$ because they are resonant at these frequencies. The echo signals are supplied to tuned receiving amplifiers 15, 16, one or both of which has an adjustable gain, and the outputs at $f_1$ and $f_2$ are represented by $S_1$ and $S_2$ respectively.

Pulses from the generator 10 are fed also to a variable time delay device 17 serving to produce trigger edges which are delayed by a variable amount relatively to the leading or trailing edges of the corresponding pulses from the generator. The output of the delay device 17 is applied to trigger a time-base generator 18 which executes a sweep in a time which is only a fraction of that required for a wave to travel to the bottom of the water and return to the surface. In this way by adjusting the time-delay device 17, the particular range of depths that it is desired to examine can be selected. The time-base saw-tooth waveform is obtained at T.B. and a bright-up pulse generator 19 controlled by the time-base generator 18 delivers at B.U. a bright-up pulse having a duration equal to that of the time-base sweep.

Referring now to FIG. 3, there is shown diagrammatically a cathode ray tube 20 having its X and Y deflecting plates arranged to deflect the cathode ray beam in directions at 45° to the vertical. The bright-up pulses B.U. are applied in a positive-going sense to the control grid 21 of the tube. The signal $S_1$ is rectified at 22, smoothed by a filter 23 and added in an adder 24 to the time-base waveform T.B., the output of the adder being applied to the plate $X_1$. The signal $S_2$ is rectified at 25, smoothed in a filter 26 and subtracted from the time-base waveform in a subtractor 27, the output of the subtractor being applied to the plate $Y_1$. The plates $X_2$ and $Y_2$ are earthed.

The nature of the traces produced on the screen 28 of the cathode ray tube by the signals on the X and Y plates respectively acting alone, can be appreciated from the voltage-time curves shown at (a) and (b) in FIG. 4. The effect of an echo is to produce an upward pulse 29 as (a) corresponding to the frequency $f_1$ and a downward pulse 30 at (b) corresponding to the frequency $f_2$. The two deflecting fields acting together produce a trace such as is shown at (c) in FIG. 4, assuming that the relative gains of the amplifiers 15 and 16 in FIG. 2 are so adjusted as to make the peaks $P_1$ and $P_2$ in FIG. 1 of approximately equal height. Thus a ratio of 10:10 is represented by a horizontal deflection as shown in full line in FIG. 4(c), a ratio 3:10 by an upwardly inclined deflection shown in broken line and a ratio of 10:3 by a downwardly inclined deflection also shown in broken line. The inclination of each fish echo will thus indicate the size of the fish. With sawtooth waves of equal amplitude applied at $X_1$ and $Y_1$ in FIG. 2 the time-base trace 31 in FIG. 4(c) will be vertical. The sea-bed echo 32 will usually be approximately horizontal.

In a modified and simplified form of display, the time-base waveform is dispensed with and the signals $S_1$ and $S_2$ are applied, after rectification and smoothing, to the plates $X_1$ and $Y_1$ respectively. The bright-up pulses B.U. are applied as in FIG. 3. The display then takes the form of a line whose inclination is dependent upon the value of the said ratio. The periphery of the screen may be marked with a scale representing fish lengths.

In FIG. 5 there is shown diagrammatically in plan view a double-beam cathode ray tube 20' which has been rotated through 90° so that the X deflection is in a vertical direction. The saw-tooth wave T.B. is applied to an X-deflecting plate and the signals $S_1$ and $S_2$ are applied after a full-wave rectifification by devices 33 and 34 to Y-deflecting plates $Y_1$ and $Y_2$ which are symmetrically disposed on either side of a plate $Y_0$ which is earthed. The steady potential differences between $Y_0$ on the one hand and $Y_1$ and $Y_2$ on the other hand are so adjusted that in the absence of signals $S_1$ and $S_2$ the two vertical lines traced on the screen 28' in response to the saw-tooth wave applied to the plate X are coincident. The signals $S_1$ and $S_2$ are applied in such senses that they produce deflections in opposite horizontal directions. As shown in FIG. 6 signals $S_1$ of frequency $f_1$ produce deflections to the right and signals $S_2$ of frequency $f_2$ produce deflections to the left. FIG. 6 represents the ratio 10:3 so that the trace produced by the echoes appears to be displaced to the right. Similarly with a ratio 3:10 the trace would appear displaced to the left. There is thus a gradation of asymmetry from left to right representing a change of fish size from small to large.

Instead of a double-beam tube there may of course be used a single-beam tube together with high speed electronic switching to apply the signals $S_1$ and $S_2$ alternately to the tube, giving the same effect as a double-beam tube.

If desired, in all embodiments, the time-base may be triggered by the bottom echo as described in the specification of Serial No. 560,820, filed January 23, 1956, Peter Roy Hopkin and William Halliday, applicants, now Patent No. 3,119,091, the necessary time delay of the signals $S_1$ and $S_2$ being produced by means of a magnetic recording drum having two recording tracks each cooperating with a separate recording and reproducing head and associated amplifiers. A common erase head covering both tracks can be used. The trigger pulse may for example be derived from the higher frequency channel as this will usually give an echo signal from the sea bed having a steeper leading edge than the lower frequency signal.

Provided that the relative gain between the two channels passing the signals $S_1$ and $S_2$ is constant, the method of measuring fish size hereinbefore described is independent of absolute gain, at least over a wide range of fish sizes. Provided also that the acoustic beams at the two frequencies are identical and coincident, the method of measurement of fish size is independent of the position of the fish in the beam. If desired, for the measurement of the smaller fish sizes (e.g. below 40 cms. in the example considered) means such as a calibrated ganged gain control means may be provided for measuring the levels of the received signals when the fish are in the centre of the beam.

Good acoustic contact between each transducer and the water is required, but the method is not upset by anomalous propagation in the medium. The gains of the two channels may be ganged by the use of a wide-band amplifier, with separate passive narrow-band filters (one of pre-set variable loss) for each channel.

Once the system has been calibrated, e.g. by means of a standard target supported on a wire and the pre-set gain control suitably adjusted on one channel, the 10:10 signal can be used as a form of short-term calibration, e.g. the ganged gain controls may be so adjusted that the 10:10 echo is of a certain amplitude marked on the face of the tube. The size of smaller fish when in the center of the acoustic beam, may then be estimated readily by comparison with this mark.

Pulse-lengths may be adjusted to be equal at the two frequencies, by choice of system band-widths.

When dealing with a very wide range of fish size, the ambiguity can be resolved by switching to another pair of frequencies.

The transducers should be mounted close together and have similar polar diagrams.

Although the method is only applicable to single fish or compact groups of fish small compared with the beam, this condition occurs much of the time at sea.

The different acoustic absorptions at the two frequencies may be compensated for by varying the relative gain of the amplifiers 15 and 16 in FIG. 2. An example of such an arrangement is shown in FIG. 7 in which like parts have the same references as in FIG. 2. In FIG. 7 two ganged gain control devices 36 and 37 are shown connected to the receiving amplifiers 15 and 16 respectively. The devices 36 and 37 may be sources of variable voltage and serve to control the gains of the two amplifiers in dependence upon the depth at which the apparatus is operating in such a manner that the different acoustic absorptions at the two frequencies are compensated for. For this purpose the devices 36 and 37 are shown in FIG. 7 as ganged to the variable delay device 17 the setting of which is varied by shaft 41 and a control member knob 38 calibrated in depths. If desired the gain control devices 36 and 37 may be arranged to be controlled separately from the delay device 17. In some cases the ratio of the gains of the two amplifiers 15 and 16 may be pre-set for some pre-determined depth and the gain of one of the amplifiers may be made adjustable. The gain control may have its scale calibrated in depth.

In FIG. 7 there are shown T/R switches 39 and 40 which are required to prevent the transmitted signal from passing to the receiving amplifiers 15 and 16 and paralysing them. Such T/R switches would also be provided in the arrangement of FIG. 2.

Instead of, or in addition to, varying the relative gain in the two receiving channels, the relative amplitude of the transmitted pulses may be varied, for example by means similar to that proposed for varying the receiver gain.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. Echo sounding apparatus comprising pulse generating means generating simultaneously pulses of acoustic oscillations of two different frequencies, transmitting transducer means coupled to said pulse generating means for transmitting into water pulses of waves at said two different frequencies impinging upon the same submerged object whose size is to be determined, receiving transducer means for receiving echoes from said object at said two different frequencies and converting said echoes into electrical signals at said two different frequencies, saw-tooth wave generating means coupled to said pulse generating means, a cathode ray tube, deflecting means for said deflecting the beam thereof in mutually perpendicular directions, means coupled to said receiving transducer means and to said saw-tooth wave generating means for combining each of said signals with a saw-tooth wave from said saw-tooth generating means and means coupling said combining means with said deflecting means, whereby said signals corresponding to echoes at the two different frequencies, each combined with saw-tooth wave, serve to deflect the cathode ray beam in mutually perpendicular directions.

2. Echo sounding apparatus comprising pulse generating means generating simultaneously pulses of acoustic oscillations of two different frequencies, transmitting transducer means coupled to said pulse generating means for transmitting into water along closely adjacent substantially parallel paths pulses of waves at said two different frequencies impinging upon the same submerged object to be indicated, receiving transducer means for receiving echoes from said object at said two different frequencies and converting said echoes into electrical signals at said two different frequencies, saw-tooth wave generating means coupled to said pulse generating means, a double beam cathode ray tube, first deflecting means deflecting the two beams of said tube in a first direction, means coupling said first deflecting means to said saw-tooth wave generating means, second and third deflecting means deflecting the two beams in opposite directions substantially perpendicular to the first direction and means coupling said receiving transducer means to said second and third deflecting means and applying the two signals respectively to said second and third deflecting means.

3. An acoustical fish finder apparatus comprising transmitter means constructed at least in part for submersion in water, said transmitter means providing acoustic waves at two different frequencies directed along closely adjacent paths for striking fish, receiver means constructed at least in part for submersion in water for receiving echo waves reflected by a fish, means connected to said receiving means and responsive to the ratio of amplitudes of said received echoes of said respective two frequencies to provide a manifestation representative of the size of said fish.

4. The combination set forth in claim 3, said transmitter means comprising transducer means and pulse generator means connected to provide envelope pulses for each said acoustical wave frequency, delay means connected to said pulse generator means for providing trigger pulses, said indicating means having a time base scanning means controlled at least in part by said trigger pulses for selecting a particular range of depths of water to be examined for the presence of fish.

5. The combination set forth in claim 3, said means for determining ratio providing a determination of the amplitude ratio of said two received echo waves, said indicator means providing an indication of the signal level of said received echoes whereby accurate determination of fish length in the range of zero to ninety centimeters is obtained.

6. Echo sounding apparatus for determining at least approximately the length of a submerged target comprising, transmitter means for transmitting into water acoustic waves at two different frequencies along adjacent substantially parallel paths toward said target, receiver means receiving echo waves at each of said frequencies after reflection from said target, and means coupled to said receiver means and responsive to the ratio of the amplitudes of the waves received at said two frequencies from said target for providing a manifestation representative of the length of said target.

7. Apparatus according to claim 6 which further includes means for selecting the range of depths from which said echo waves are fed to said coupling means.

8. Apparatus according to claim 6 wherein said transmitter means and said receiver means are constructed to operate under water, utilizing acoustic waves, said frequencies differing by at least fifty percent of the lower frequency.

9. Apparatus according to claim 6 comprising two signal channels coupled to said receiver means and selectively responsive to signals at the two different frequencies respectively and gain control means in at least one of said channels for controlling the relative gain of the two channels.

References Cited in the file of this patent

UNITED STATES PATENTS

| 2,018,463 | Muchow | Oct. 22, 1935 |
| 2,409,462 | Zworykin et al. | Oct. 15, 1946 |
| 2,527,547 | Hardy | Oct. 31, 1950 |
| 2,531,201 | De Lange | Nov. 21, 1950 |
| 2,640,190 | Rines | May 26, 1953 |
| 2,813,590 | McDonald | Nov. 19, 1957 |
| 2,817,832 | Mathes | Dec. 24, 1957 |
| 2,972,731 | Beebe | Feb. 21, 1961 |
| 3,066,279 | Marks | Nov. 27, 1962 |
| 3,087,111 | Lehan et al. | Apr. 23, 1963 |
| 3,094,681 | Kietz et al. | June 18, 1963 |

FOREIGN PATENTS

| 1,037,328 | Germany | Aug. 21, 1958 |
| 1,181,240 | France | Jan. 5, 1959 |